(12) United States Patent
Moore

(10) Patent No.: US 7,294,040 B2
(45) Date of Patent: Nov. 13, 2007

(54) METHOD AND APPARATUS FOR SUPPORTING A MICROELECTRONIC SUBSTRATE RELATIVE TO A PLANARIZATION PAD

(75) Inventor: Scott E. Moore, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/641,473

(22) Filed: Aug. 14, 2003

(65) Prior Publication Data

US 2004/0108062 A1    Jun. 10, 2004

Related U.S. Application Data

(62) Division of application No. 09/652,453, filed on Aug. 31, 2000, now Pat. No. 6,623,329.

(51) Int. Cl.
*B24B 49/00*    (2006.01)
*B24B 51/00*    (2006.01)
*B24B 7/00*    (2006.01)

(52) U.S. Cl. .......................... 451/8; 451/41; 451/285; 451/286; 451/388

(58) Field of Classification Search ................ 451/5, 451/7, 8, 41, 53, 285–289
See application file for complete search history.

(56) References Cited

U.S. PATENT DOCUMENTS

| | | |
|---|---|---|
| 4,256,535 A | 3/1981 | Banks |
| 4,373,991 A | 2/1983 | Banks |
| 4,869,779 A | 9/1989 | Acheson |
| 5,020,283 A | 6/1991 | Tuttle |
| 5,196,353 A | 3/1993 | Sandhu et al. |
| 5,222,329 A | 6/1993 | Yu |
| 5,232,875 A | 8/1993 | Tuttle et al. |
| 5,240,552 A | 8/1993 | Yu et al. |
| 5,244,534 A | 9/1993 | Yu et al. |
| 5,314,843 A | 5/1994 | Yu et al. |
| 5,373,991 A * | 12/1994 | Nelson ........................ 239/333 |
| 5,449,314 A | 9/1995 | Meikle et al. |
| 5,486,129 A | 1/1996 | Sandhu et al. |
| 5,514,245 A | 5/1996 | Doan et al. |
| 5,540,810 A | 7/1996 | Sandhu et al. |

(Continued)

FOREIGN PATENT DOCUMENTS

JP    2002-257138    *  9/2002

*Primary Examiner*—M. Rachuba
(74) *Attorney, Agent, or Firm*—Perkins Coie LLP

(57) ABSTRACT

A method and apparatus for planarizing a microelectronic substrate. In one embodiment, one surface of the microelectronic substrate is engaged with a planarizing pad and the opposite surface of the microelectronic substrate is positioned proximate to a substrate support. A bearing liquid, such as a planarizing liquid, is directed toward the second surface of the microelectronic substrate to form a liquid bearing between the substrate and substrate support. The microelectronic substrate can precess relative the substrate support as the substrate support moves relative to the planarizing pad. The substrate support can include a sensor to determine a characteristic, such as a thickness, of the liquid bearing. In another embodiment, a portion of the liquid bearing can be removed from the second surface of the microelectronic substrate to control the thickness of the liquid bearing and/or to remove particulate matter from the liquid bearing.

21 Claims, 4 Drawing Sheets

U.S. PATENT DOCUMENTS

| | | |
|---|---|---|
| 5,609,718 A | 3/1997 | Meikle |
| 5,616,069 A | 4/1997 | Walker et al. |
| 5,618,381 A | 4/1997 | Doan et al. |
| 5,624,303 A | 4/1997 | Robinson |
| 5,643,048 A | 7/1997 | Iyer |
| 5,645,682 A | 7/1997 | Skrovan |
| 5,650,619 A | 7/1997 | Hudson |
| 5,655,951 A | 8/1997 | Meikle et al. |
| 5,658,190 A | 8/1997 | Wright et al. |
| 5,663,797 A | 9/1997 | Sandhu |
| 5,679,065 A | 10/1997 | Henderson |
| 5,690,540 A | 11/1997 | Elliott et al. |
| 5,698,455 A | 12/1997 | Meikle et al. |
| 5,702,292 A | 12/1997 | Brunelli et al. |
| 5,725,417 A | 3/1998 | Robinson |
| 5,736,427 A | 4/1998 | Henderson |
| 5,738,567 A | 4/1998 | Manzonie et al. |
| 5,747,386 A | 5/1998 | Moore |
| 5,759,918 A | 6/1998 | Hoshizaki et al. |
| 5,762,539 A | 6/1998 | Nakashiba et al. |
| 5,779,522 A | 7/1998 | Walker et al. |
| 5,782,675 A | 7/1998 | Southwick |
| 5,792,709 A | 8/1998 | Robinson et al. |
| 5,795,218 A | 8/1998 | Doan et al. |
| 5,795,495 A | 8/1998 | Meikle |
| 5,798,302 A | 8/1998 | Hudson et al. |
| 5,801,066 A | 9/1998 | Meikle |
| 5,823,855 A | 10/1998 | Robinson |
| 5,830,806 A | 11/1998 | Hudson et al. |
| 5,846,336 A | 12/1998 | Skrovan |
| 5,855,804 A | 1/1999 | Walker |
| 5,868,896 A | 2/1999 | Robinson et al. |
| 5,871,392 A | 2/1999 | Meikle et al. |
| 5,879,222 A | 3/1999 | Robinson |
| 5,879,226 A | 3/1999 | Robinson |
| 5,882,248 A | 3/1999 | Wright et al. |
| 5,893,754 A | 4/1999 | Robinson et al. |
| 5,894,852 A | 4/1999 | Gonzales et al. |
| 5,906,532 A * | 5/1999 | Nakajima et al. ............. 451/41 |
| 5,910,043 A | 6/1999 | Manzonie et al. |
| 5,910,846 A | 6/1999 | Sandhu |
| 5,934,980 A | 8/1999 | Koos et al. |
| 5,938,801 A | 8/1999 | Robinson |
| 5,954,912 A | 9/1999 | Moore |
| 5,972,792 A | 10/1999 | Hudson |
| 5,976,000 A | 11/1999 | Hudson |
| 5,980,363 A | 11/1999 | Meikle et al. |
| 5,981,396 A | 11/1999 | Robinson et al. |
| 5,989,470 A | 11/1999 | Doan et al. |
| 5,994,224 A | 11/1999 | Sandhu et al. |
| 5,997,384 A | 12/1999 | Blalock |
| 6,036,586 A | 3/2000 | Ward |
| 6,039,633 A | 3/2000 | Chopra |
| 6,040,245 A | 3/2000 | Sandhu et al. |
| 6,046,111 A | 4/2000 | Robinson |
| 6,054,015 A | 4/2000 | Brunelli et al. |
| 6,057,602 A | 5/2000 | Hudson et al. |
| 6,083,085 A | 7/2000 | Lankford |
| 6,106,351 A | 8/2000 | Raina et al. |
| 6,106,728 A * | 8/2000 | Iida et al. ................... 210/743 |
| 6,108,092 A | 8/2000 | Sandhu |
| 6,110,820 A | 8/2000 | Sandhu et al. |
| 6,114,706 A | 9/2000 | Meikle et al. |
| 6,120,354 A | 9/2000 | Koos et al. |
| 6,124,207 A | 9/2000 | Robinson et al. |
| 6,139,402 A | 10/2000 | Moore |
| 6,143,123 A | 11/2000 | Robinson et al. |
| 6,186,870 B1 | 2/2001 | Wright et al. |
| 6,187,681 B1 | 2/2001 | Moore |
| 6,190,494 B1 | 2/2001 | Dow |
| 6,191,037 B1 | 2/2001 | Robinson et al. |
| 6,191,864 B1 | 2/2001 | Sandhu |
| 6,196,896 B1 | 3/2001 | Sommer |
| 6,200,901 B1 | 3/2001 | Hudson et al. |
| 6,203,407 B1 | 3/2001 | Robinson |
| 6,203,413 B1 | 3/2001 | Skrovan |
| 6,206,754 B1 | 3/2001 | Moore |
| 6,206,759 B1 | 3/2001 | Agarwal et al. |
| 6,206,769 B1 | 3/2001 | Walker |
| 6,210,257 B1 | 4/2001 | Carlson |
| 6,213,845 B1 | 4/2001 | Elledge |
| 6,227,955 B1 | 5/2001 | Custer et al. |
| 6,234,877 B1 | 5/2001 | Koos et al. |
| 6,234,878 B1 | 5/2001 | Moore |
| 6,238,270 B1 | 5/2001 | Robinson |
| 6,238,273 B1 | 5/2001 | Southwick |
| 6,244,944 B1 | 6/2001 | Elledge |
| 6,250,994 B1 | 6/2001 | Chopra et al. |
| 6,261,163 B1 | 7/2001 | Walker et al. |
| 6,271,139 B1 | 8/2001 | Alwan et al. |
| 6,273,101 B1 | 8/2001 | Gonzales et al. |
| 6,273,800 B1 | 8/2001 | Walker et al. |
| 6,276,998 B1 * | 8/2001 | Sommer et al. ............. 451/41 |
| 6,284,660 B1 | 9/2001 | Doan |
| 6,287,879 B1 | 9/2001 | Gonzales et al. |
| 6,290,572 B1 | 9/2001 | Hofmann |
| 6,296,557 B1 | 10/2001 | Walker |
| 6,301,006 B1 | 10/2001 | Doan |
| 6,306,008 B1 | 10/2001 | Moore |
| 6,306,014 B1 | 10/2001 | Walker et al. |
| 6,309,282 B1 | 10/2001 | Wright et al. |
| 6,312,558 B2 | 11/2001 | Moore |
| 6,319,420 B1 | 11/2001 | Dow |
| 6,323,046 B1 | 11/2001 | Agarwal |
| 6,325,702 B2 | 12/2001 | Robinson |
| 6,328,632 B1 | 12/2001 | Chopra |
| 6,331,135 B1 | 12/2001 | Sabde et al. |
| 6,331,139 B2 | 12/2001 | Walker et al. |
| 6,331,488 B1 | 12/2001 | Doan et al. |
| 6,350,180 B2 | 2/2002 | Southwick |
| 6,350,691 B1 | 2/2002 | Lankford |
| 6,352,466 B1 | 3/2002 | Moore |
| 6,352,470 B2 | 3/2002 | Elledge |
| 6,372,111 B1 * | 4/2002 | Watts ........................ 205/101 |
| 6,623,329 B1 * | 9/2003 | Moore .......................... 451/5 |
| 6,776,871 B2 * | 8/2004 | Agarwal ................ 156/345.13 |
| 6,802,983 B2 * | 10/2004 | Mullee et al. .............. 210/749 |
| 2002/0025759 A1 * | 2/2002 | Lee et al. ..................... 451/36 |
| 2002/0025760 A1 * | 2/2002 | Lee et al. ..................... 451/36 |
| 2002/0151256 A1 * | 10/2002 | Taylor et al. ................. 451/41 |
| 2004/0108062 A1 * | 6/2004 | Moore .................. 156/345.11 |
| 2005/0026555 A1 * | 2/2005 | Castor ........................ 451/288 |

* cited by examiner

… …

METHOD AND APPARATUS FOR SUPPORTING A MICROELECTRONIC SUBSTRATE RELATIVE TO A PLANARIZATION PAD

CROSS-REFERENCE TO RELATED APPLICATION

This application is a divisional application of U.S. patent application Ser. No. 09/652,453 entitled "METHOD AND APPARATUS FOR SUPPORTING A MICROELECTRONIC SUBSTRATE RELATIVE TO A PLANARIZATION PAD," filed on Aug. 31, 2000, now U.S. Pat. No. 6,623,329, issued Sep. 23, 2003, which is incorporated herein by reference in its entirety.

TECHNICAL FIELD

This invention relates to methods and apparatuses for supporting microelectronic substrates during planarization.

BACKGROUND

Mechanical and chemical-mechanical planarization processes (collectively "CMP") are used in the manufacturing of electronic devices for forming a flat surface on semiconductor wafers, field emission displays and many other microelectronic-device substrate assemblies. CMP processes generally remove material from a substrate or substrate assembly to create a highly planar surface at a precise elevation in the layers of material on the substrate. FIG. 1 schematically illustrates an existing web-format-planarizing machine 10 for planarizing a substrate 60. The planarizing machine 10 has a support table 14 with a sub-pad 16 at a workstation where an operative portion "A" of a planarizing pad 40 is positioned. The sub-pad 16 is generally a rigid plate to provide a flat, solid surface to which a particular section of the planarizing pad 40 may be secured during planarization.

The planarizing machine 10 also has a plurality of rollers to guide, position and hold the planarizing pad 40 over the sub-pad 16. The rollers include a supply roller 20, idler rollers 21, guide rollers 22, and a take-up roller 23. The supply roller 20 carries an unused or pre-operative portion of the planarizing pad 40, and the take-up roller 23 carries a used or post-operative portion of the planarizing pad 40. Additionally, the left idler roller 21 and the upper guide roller 22 stretch the planarizing pad 40 over the sub-pad 16 to hold the planarizing pad 40 stationary during operation. A motor (not shown) drives at least one of the supply roller 20 and the take-up roller 23 to sequentially advance the planarizing pad 40 across the sub-pad 16. Accordingly, clean pre-operative sections of the planarizing pad 40 may be quickly substituted for used sections to provide a consistent surface for planarizing and/or cleaning the substrate 60.

The web-format-planarizing machine 10 also has a carrier assembly 30 that controls and protects the substrate 60 during planarization. The carrier assembly 30 generally has a substrate holder 50 to pick up, hold and release the substrate 60 at appropriate stages of the planarizing process. The substrate holder 50 engages a retainer ring 31 that surrounds the microelectronic substrate 60 and restricts lateral motion of the microelectronic substrate 60 relative to the substrate holder 50. Several nozzles 33 attached to the substrate holder 50 dispense a planarizing solution 44 onto a planarizing surface 42 of the planarizing pad 40. The carrier assembly 30 also generally has a support gantry 34 carrying a drive assembly 35 that can translate along the gantry 34. The drive assembly 35 generally has an actuator 36, a drive shaft 37 coupled to the actuator 36, and an arm 38 projecting from the drive shaft 37. The arm 38 carries the substrate holder 50 via a terminal shaft 39 such that the drive assembly 35 orbits the substrate holder 50 about an axis B-B (as indicated by arrow "$R_1$"). The terminal shaft 39 may also rotate the substrate holder 50 about its central axis C-C (as indicated by arrow "$R_2$").

The planarizing pad 40 and the planarizing solution 44 define a planarizing medium that mechanically and/or chemically-mechanically removes material from the surface of the substrate 60. The planarizing pad 40 used in the web-format planarizing machine 10 is typically a fixed-abrasive planarizing pad in which abrasive particles are fixedly bonded to a suspension material. In fixed-abrasive applications, the planarizing solution is a "clean solution" without abrasive particles. In other applications, the planarizing pad 40 may be a non-abrasive pad without abrasive particles. The planarizing solutions 44 used with the non-abrasive planarizing pads are typically CMP slurries with abrasive particles and chemicals.

To planarize the substrate 60 with the planarizing machine 10, the carrier assembly 30 presses the substrate 60 against the planarizing surface 42 of the planarizing pad 40 in the presence of the planarizing solution 44. The drive assembly 35 then orbits the substrate holder 50 about the axis B-B and optionally rotates the substrate holder 50 about the axis C-C to translate the substrate 60 across the planarizing surface 42. As a result, the abrasive particles and/or the chemicals in the planarizing medium remove material from the surface of the substrate 60.

The CMP processes should consistently and accurately produce a uniformly planar surface on the substrate 60 to enable precise fabrication of circuits and photo-patterns. During the fabrication of transistors, contacts, interconnects and other features, many substrates or substrate assemblies develop large "step heights" that create a highly topographic surface across the substrate assembly. Yet, as the density of integrated circuits increases, it is necessary to have a planar substrate surface at several intermediate stages during the fabrication of devices on a substrate assembly because non-uniform substrate surfaces significantly increase the difficulty of forming sub-micron features. For example, it is difficult to accurately focus photo patterns to within tolerances approaching 0.1 micron on non-uniform substrate surfaces because sub-micron photolithographic equipment generally has a very limited depth of field. Thus, CMP processes are often used to transform a topographical substrate surface into a highly uniform, planar substrate surface.

One problem with some conventional CMP techniques is that the carrier assembly 30 may not apply a uniform downward force on the substrate 60. Accordingly, the planarized surface of the substrate 60 may develop non-uniformities that can adversely affect subsequent processing steps. One approach to address this problem is to rotate the substrate 60 and the substrate holder 50 as a unit about axis C-C, but a drawback with this approach is that it increases the mechanical complexity of the substrate holder 50 and the carrier assembly 30. This approach particularly increases the mechanical complexity if the carrier assembly 30 includes fluid couplings between the arm 38 and the substrate holder 50 (for example, to supply the planarizing liquid 44 to the nozzles 33).

Another problem with some conventional devices is that the retainer ring 31 can wipe the planarizing liquid 44 from the planarizing pad 40 as the substrate carrier 50 and the substrate 60 move across the planarizing pad 40. Accordingly, the planarizing liquid 44 may not uniformly coat the lower surface of the substrate 60, which can reduce the planarizing rate and/or the planarity of the substrate 60. Still another problem is that the carrier assembly 30 can include a disposable film at the interface between the substrate holder 50 and the substrate 60 to grip the substrate 60. The disposable film must be periodically replaced, which increases the time and expense required to maintain the apparatus 10.

One approach for addressing some of the foregoing problems is to direct pressurized air against the rear surface of the substrate 60 during planarization. For example, U.S. Pat. No. 5,762,539 to Nakashiba et al. discloses a carrier apparatus that directs several jets of compressed air at different pressures toward the rear surface of the substrate to bias the substrate against the polishing pad while the carrier rotates relative to the polishing pad. One drawback with this approach is that the arrangement for supplying compressed air to the carrier may be complex and subject to leaks because it includes rotary couplings that direct the compressed air to the rotating carrier. A further disadvantage is that the compressed air can evaporate the planarizing liquid, reducing the effectiveness of the planarizing medium. When the planarizing liquid includes an abrasive slurry, the compressed air can evaporate the liquid portion of the slurry, causing the abrasive particles in the slurry to agglomerate. Furthermore, the thickness of the air cushion between the carrier and substrate can be difficult to control because the air has a relatively low viscosity.

U.S. Pat. No. 4,869,779 to Acheson discloses directing planarizing liquid upwardly from beneath the polishing pad against the front surface of the substrate. One drawback with this approach is that the carrier that supports the substrate relative to the polishing pad "floats" over the polishing pad. Accordingly, the apparatus cannot easily vary the downward force between the substrate and the polishing pad.

U.S. Pat. No. 4,256,535 to Banks discloses placing a drop of water between the rear surface of the substrate and the carrier. One drawback with this approach is that the water can be squeezed out from between the substrate and the carrier during planarization. Accordingly, the carrier can contact the rear surface of the substrate and abrade material from the substrate. The abraded material can then become caught between the downwardly facing surface of the substrate and the planarizing pad, potentially scratching the surface of the substrate. Another drawback is that the substrate rotates freely relative to the holder, which can reduce control over the motion of the substrate.

U.S. Pat. No. 4,373,991, also to Banks, discloses directing a continuous flow of pressurized water against the backside of the substrate. One problem with this approach is that the substrate carrier rotates relative to its support arm, increasing the mechanical complexity of the apparatus, as discussed above.

SUMMARY

The present invention is directed toward methods and apparatuses for planarizing microelectronic substrates. A method in accordance with one aspect of the invention includes facing a first surface of the microelectronic substrate toward a planarizing surface of a planarizing pad and biasing the microelectronic substrate toward the planarizing surface by directing a flow of planarizing liquid toward a second surface of the microelectronic substrate facing generally opposite the first surface. In one embodiment, the planarizing liquid includes water and at least one of an etchant, oxidant, surfactant, abrasive particle or other chemical compound to control the removal of material from the substrate. The method can further include disposing the planarizing liquid between the first surface of the microelectronic substrate and the planarizing pad by moving one or the other of the microelectronic substrate and the planarizing pad. The rate and/or manner of material removal from the microelectronic substrate is controlled by engaging the planarizing liquid with the first surface of the microelectronic substrate.

In another aspect of the invention, the method can include positioning the microelectronic substrate proximate to a substrate support and biasing the microelectronic substrate toward the planarizing surface by directing a flow of liquid toward the second surface of the microelectronic substrate. The method can further include moving at least one of the microelectronic substrate and the planarizing pad relative to the other and monitoring a characteristic of a liquid layer that forms between the microelectronic substrate and the substrate support, for example by monitoring the pressure of the liquid or electrical characteristics of the liquid. In a further aspect of the invention, a portion of the liquid can be removed from the second surface of the microelectronic substrate to control the pressure against the second surface. The removed liquid can be monitored for the presence of particulate matter and, in still a further aspect of the invention, the particulate matter can be removed and the liquid recycled.

The present invention is also directed toward an apparatus for planarizing a microelectronic substrate having a first surface and a second surface opposite the first surface. In one aspect of the invention, the apparatus can include a planarizing pad having a planarizing surface configured to engage the first surface of the microelectronic substrate and a substrate support having a retaining surface positioned to at least restrict lateral motion of the microelectronic substrate relative to the planarizing pad. The substrate support can have at least one fluid orifice directed toward the second surface of the microelectronic substrate and coupled to a source of planarizing liquid selected to control a rate and/or manner of material removed from the microelectronic substrate when the microelectronic substrate engages the planarizing pad and one of the microelectronic substrate and the planarizing pad moves relative to the other.

In another aspect of the invention, the apparatus can include a sensor positioned to monitor a characteristic of a liquid layer between the second surface of the microelectronic substrate and the substrate support. In still another aspect of the invention, the apparatus can include a vacuum source having a removal aperture in fluid communication with the substrate support for removing a portion of the liquid proximate to the second surface of the microelectronic substrate.

DETAILED DESCRIPTION

The present disclosure describes methods and apparatuses for chemical and/or chemical-mechanical planarizing of substrates and substrate assemblies used in the fabrication of microelectronic devices. Many specific details of certain embodiments of the invention are set forth in the following description and in FIGS. 2-4 to provide a thorough understanding of these embodiments. One skilled in the art, however, will understand that the present invention may have additional embodiments, or that the invention may be practiced without several of the details described below.

Figure 1:
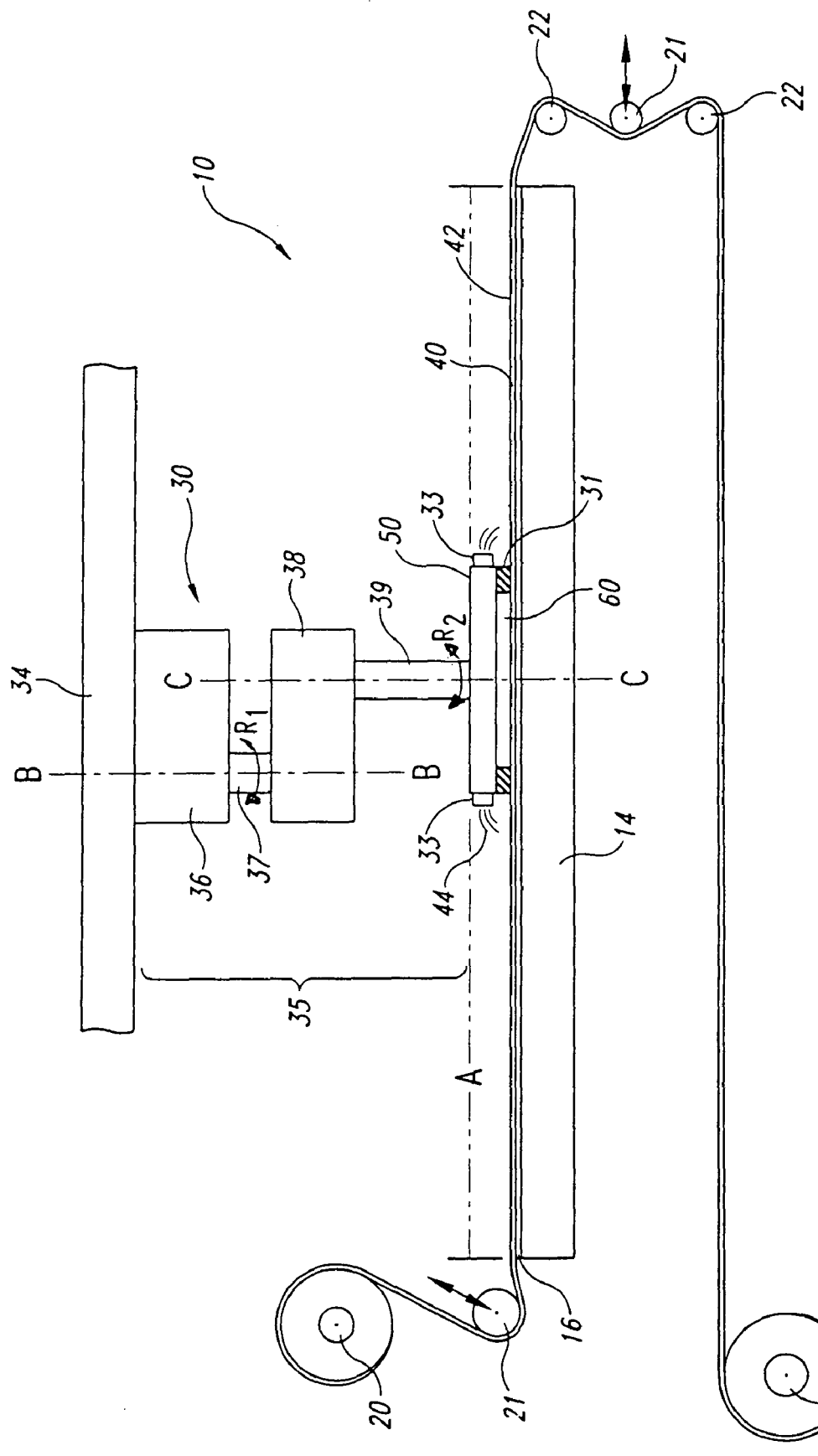
FIG. 1 is a partially schematic side elevational view of a planarizing apparatus in accordance with the prior art.
Figure 2:
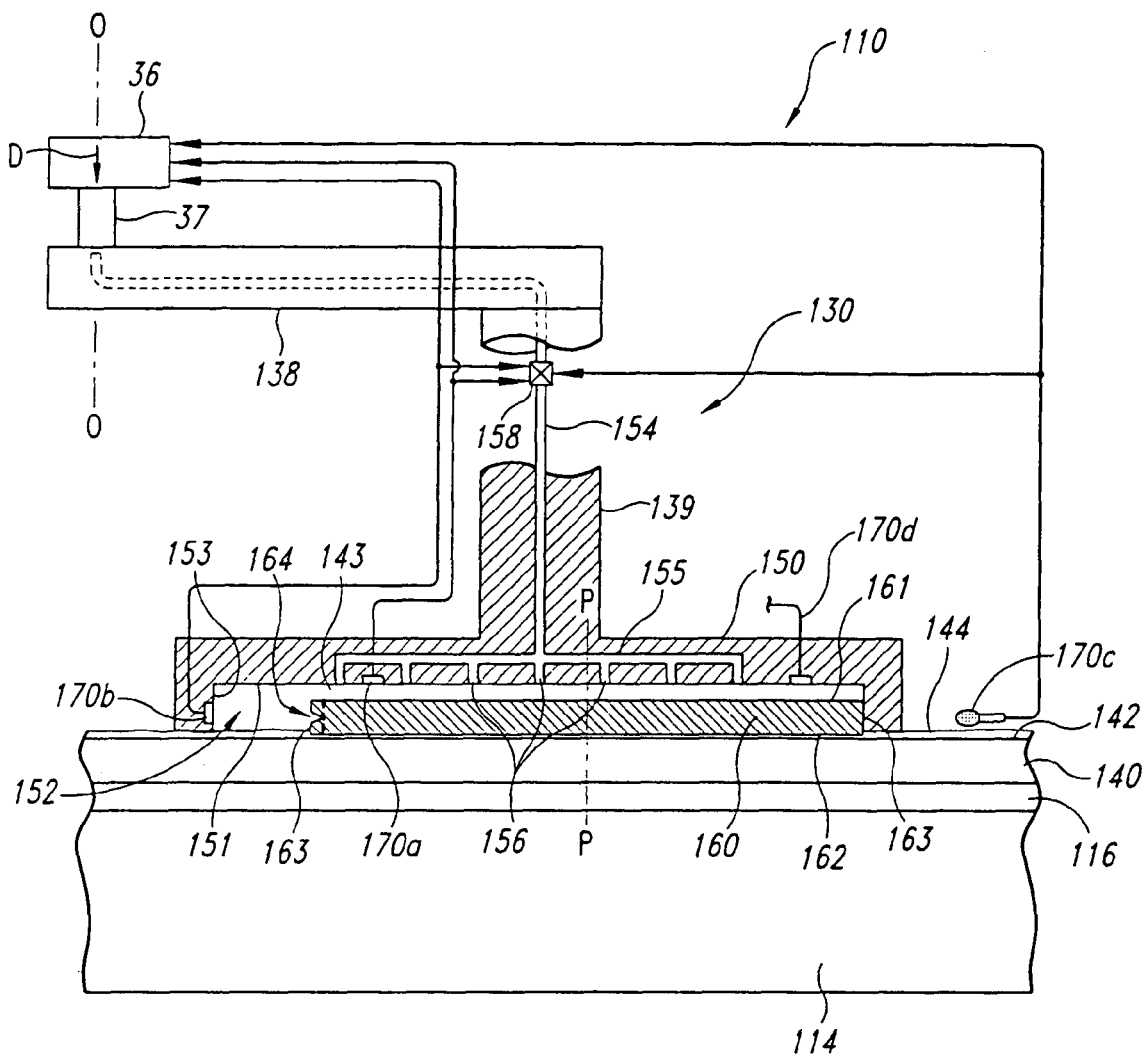
FIG. 2 is a partially schematic side elevational view of a portion of a planarizing apparatus that controls motion of a microelectronic substrate with a liquid bearing in accordance with an embodiment of the invention.

FIG. 2 is a partially schematic side elevational view of a portion of a planarizing apparatus 110 in accordance with an embodiment of the invention. The apparatus 110 includes a planarizing pad 140 supported on a support table 114 and a sub-pad 116 in a manner generally similar to that discussed above. The planarizing pad 140 has an upwardly facing planarizing surface 142 that supports a planarizing liquid 144. In one aspect of this embodiment, the planarizing liquid 144 includes a suspension of abrasive particles for mechanically removing material from a microelectronic substrate 160. Alternatively, the abrasive particles can be fixedly embedded in the planarizing pad 140. In either embodiment, the microelectronic substrate 160 is supported by a substrate support 150 that is coupled to a carrier assembly 130 for moving the microelectronic substrate 160 relative to the planarizing pad 140. As used herein, the term "microelectronic substrate" refers to a microelectronic substrate material with or without an assembly of microelectronic devices or features.

In one embodiment, the microelectronic substrate 160 is generally flat and has a generally circular planform shape with a lower surface 162 facing toward the planarizing pad 140, an upper surface 161 facing opposite the lower surface 162, and a side surface 163 between the upper and lower surfaces. The substrate support 150 can include a shallow cylindrical cavity 152 for receiving the microelectronic substrate 160. The cavity 152 can be defined by a bearing surface 151 that faces toward the upper surface 161 of the microelectronic substrate 160 and a cavity wall or retaining surface 153 that extends downwardly from the bearing surface 151 and faces toward the side surface 163 of the microelectronic substrate 160. In one aspect of this embodiment, the diameter of the cavity 152 is larger than the diameter of the microelectronic substrate 160 so that at least a portion of the cavity wall 153 is spaced apart from the side surface 163 of the microelectronic substrate 160. Accordingly, the microelectronic substrate 160 can move laterally within the cavity 152 by an amount that is limited by the cavity wall 153.

In a further aspect of this embodiment, the substrate holder 150 can include a liquid bearing 143 between the bearing surface 151 and the upper surface 161 of the microelectronic substrate 160. The liquid bearing 143 can reduce friction between the substrate support 150 and the upper surface 161 of the microelectronic substrate 160 by inhibiting or even eliminating direct physical contact between the two. In one embodiment, the liquid in the liquid bearing 143 is continuously replenished by a liquid supply conduit 154 coupled to a source (not shown) of bearing liquid. The liquid supply conduit 154 can deliver the bearing liquid to a plenum 155 in fluid communication with a plurality of orifices 156 in the bearing surface 151. In one aspect of this embodiment, the orifices 156 are offset radially inwardly from the cavity wall 153 so that all the orifices 156 face directly toward the upper surface 161 of the microelectronic substrate 160 even when the microelectronic substrate 160 moves laterally within the cavity 152. Accordingly, all the liquid supplied through the orifices 156 will flow into the liquid bearing 143 to reduce the likelihood of contact between the upper surface 161 of the microelectronic substrate 160 and the bearing surface 151 of the substrate support 150.

In one embodiment, the bearing liquid has a different chemical composition than the planarizing liquid 144, but the bearing liquid is chemically compatible with the planarizing liquid 144 so as not to impact the performance of the planarizing liquid 144. Alternatively, the bearing liquid can have the same chemical composition as the planarizing liquid 144. For example, the bearing liquid can supplement the planarizing liquid 144 already on the planarizing pad 140. Alternatively, the bearing liquid provided through the orifices 156 can be the sole source of the planarizing liquid 144. Accordingly, the bearing liquid can provide such functions as chemically activating the planarizing pad 140, chemically or chemically-mechanically etching the lower surface 162 of the microelectronic substrate 160, oxidizing the lower surface 162 of the microelectronic substrate 160, inhibiting bonding between abrasive particles, lubricating the interface between the lower surface 162 and the planarizing pad 140 and/or other functions of planarizing liquids. All of these functions of the bearing liquid can be in addition to reducing friction between the upper surface 161 of the microelectronic substrate 160 and the substrate support 150.

In one embodiment, the temperature of the bearing liquid can be controlled to control the rate and/or manner in which material is removed from the microelectronic substrate 160. For example, when the bearing liquid chemically interacts with the microelectronic substrate 160 to remove material from the surface of the microelectronic substrate, the chemical reaction rate between the bearing liquid and the microelectronic substrate 160 can be temperature dependent. Accordingly, the temperature of the bearing liquid can be controlled to optimize the reaction rate.

In one embodiment, the substrate support 150 is rigidly connected to a terminal shaft 139 that is rigidly connected to a lateral arm 138. The lateral arm 138 can be coupled with a drive shaft 137 to an actuator 136 that orbits the lateral arm 138 and the substrate support 150 about an axis OO-O, or sweeps the substrate support 150 over the planarizing surface 142 of the planarizing pad 140. Accordingly, a point on the substrate support 150 that faces toward the periphery of the planarizing pad 140 always faces toward the periphery, even as the substrate support 150 orbits relative to the planarizing pad 140. As a result, the portion of the liquid supply conduit 154 extending between the substrate support 150 and the lateral arm 138 need not include rotary couplings.

As the substrate support 150 orbits or translates, the microelectronic substrate 160 precesses relative to the substrate support 150 and the planarizing pad 140 because the side surface 163 of the microelectronic substrate 160 rolls along the cavity wall 153 of the substrate support 150. Accordingly the microelectronic substrate 160 can rotate about its central axis P-P while the central axis P-P orbits relative to the substrate support 150 to describe a cylindrical volume.

In one embodiment, the actuator 136 can apply a downward force (indicated by arrow D) to the microelectronic substrate 160 via the lateral arm 138, the terminal shaft 139 and the substrate support 150. The downward force biases the microelectronic substrate 160 against the planarizing pad 140 to remove material from the lower surface 162 of the microelectronic substrate 160 as the substrate support 150 moves the microelectronic substrate 160 relative to the planarizing pad 140.

In one aspect of this embodiment, the bearing liquid is supplied to the substrate support 150 at a pressure that produces a force on the microelectronic substrate 160 that exceeds the downward force applied by the actuator 136. Accordingly, the bearing liquid separates the microelectronic substrate 160 from the bearing surface 151 by forming the liquid bearing 143 discussed above. The apparatus 110 can include one or more sensors (collectively referred to as "sensors 170") that monitor the liquid bearing 143 as the substrate support 150 moves relative to the planarizing pad 140. In a further aspect of this embodiment, the sensors 170 can detect the thickness of the liquid bearing 143. For example, the apparatus 110 can include an electrical sensor 170a in the bearing surface 151 of the substrate support 150 opposite the microelectronic substrate 160. In one aspect of this embodiment, the electrical sensor 170a can form a portion of a capacitor circuit, along with the microelectronic substrate 160, the substrate support 150 and the liquid bearing 143. The electrical sensor 170a can detect a change in the capacitance of the circuit as the thickness of the liquid bearing 143 changes. Alternatively, the sensor 170a can detect the change in the conductivity, resistivity or inductance of the circuit or circuit portion as the thickness of the liquid bearing 143 changes. In still another embodiment, the sensor 170 can detect changes in a magnetic field adjacent the microelectronic substrate 160 as the thickness of the liquid bearing 143 changes.

In any of the foregoing embodiments, the sensor 170a can be coupled to the carrier assembly 130 to form a feedback loop for automatically controlling the force applied to the microelectronic substrate 160. For example, the sensor 170a can be coupled to a valve 158 in the liquid supply conduit 154 to control the amount and/or pressure of the liquid supplied to the liquid bearing 143. When the liquid bearing 143 is too thin, the amount of liquid supplied by the liquid supply conduit 154 and/or the pressure of the liquid can be increased by automatically adjusting the valve 158 in response to signals received from the sensor 170a. Alternatively, the sensor 170a can be coupled to the actuator 136 to adjust the downward force applied by the actuator 136. In this alternate embodiment, the downward force applied by the actuator 136 can be reduced if the liquid bearing 143 becomes too thin.

In an alternate embodiment, the apparatus 110 can include one or more light emitters/sensors 170b that direct light toward the microelectronic substrate 160 and receive reflections or other optical feedback from the microelectronic substrate 160. For example, the microelectronic substrate 160 can include one or more notches 164 or other reflective features positioned in the side surface 163. The sensor 170b can detect the rotation rate of the microelectronic substrate 160 within the cavity 152 based on the rate at which the sensor 170b detects optical feedback due to the notches 164. Accordingly, if the liquid bearing 143 becomes so thin that the upper surface 161 of the microelectronic substrate 160 touches the bearing surface 151, the rotation rate of the microelectronic substrate 160 will decrease, and this decrease can be detected by the sensor 170b. The sensor 170b can also be coupled to either the liquid supply conduit 154 or the actuator 136 to provide a feedback loop that operates in a manner generally similar to that discussed above with reference to the electrical sensor 170a.

In other embodiments, the sensor 170b and/or the microelectronic substrate 160 can have other configurations. For example, the notch 164 can extend through a portion of the side surface 163 of the microelectronic substrate 160 from the upper surface 161 to the lower surface 162 (as shown in dashed lines in FIG. 2). The sensor 170b can be positioned above the microelectronic substrate 160 (for example, in the lower surface of the substrate support 150) to detect an optical change as the microelectronic substrate 160 moves below. Alternatively, the notch 164 can be replaced with a flat region or another indexing feature.

In another embodiment, the sensor 170b can be mounted in the bearing surface 151 of the substrate support 150, facing the upper surface 161 of the microelectronic substrate 160. In one aspect of the embodiment, the sensor 170b can detect changes in the thickness of the liquid bearing 143 by detecting a spectral shift or an interference pattern produced when light directed toward the upper surface 161 from a light source (not shown) reflects from the upper surface 161 to the sensor 170b. The incident light can strike the upper surface 161 at a normal or non-normal angle. Alternatively, the sensor 170b can detect a change in the intensity of the reflected light as the thickness of the liquid bearing changes.

In still another embodiment, the apparatus 110 can include a microphone or other acoustic sensor 170c that detects sounds emitted by the microelectronic substrate 160 and/or the substrate support 150 as the thickness of the liquid bearing 143 changes. For example, the thickness of the liquid bearing 143 may become so small that the microelectronic substrate 160 intermittently adheres to and releases from the bearing surface 151. The microelectronic substrate 160 will tend to impinge on the cavity wall 153 when it releases from the bearing surface 151. The sudden contact between the microelectronic substrate 160 and the cavity wall 153 can release sonic energy that is detected by the acoustic detector 170c. Alternatively, the acoustic sensor 170c can detect other sonic energy that can correlate to the thickness of the liquid bearing 143. For example, the sensor 170c can also include a sonic energy emitter and receiver, and can detect characteristics and/or changes in the received sonic energy that correspond to the thickness of the liquid bearing 143. In a further aspect of this embodiment, the sensor 170c can detect changes in acoustic waves reflected by the microelectronic substrate 160, the cavity wall 153 and/or other portions of the apparatus 110.

In yet another embodiment, the apparatus 110 can include a pressure sensor 170d in the cavity 152. The pressure sensor 170d can detect changes in fluid pressure within the cavity 152 as the microelectronic substrate rolls along the cavity wall 153. The changes in pressure will tend to form a regular pattern unless the microelectronic substrate 160 contacts the bearing surface, in which case the regular pattern will be disrupted. The pressure sensor 170d can detect the pattern disruption and provide an input signal to the supply conduit 154 and/or the actuator 136 in a manner similar to that discussed above. In other embodiments, the sensor 170 can include other devices, such as those discussed below with reference to FIG. 3.

One feature of an embodiment of the apparatus 110 discussed above with reference to FIG. 2 is that the substrate support 150 can supply a continuous flow of bearing liquid to the interface between the bearing surface 151 and the microelectronic substrate 160. Accordingly, the apparatus 110 can continuously control the friction between the microelectronic substrate 160 and the substrate support 150 while allowing the microelectronic substrate 160 to move in a controlled manner within the cavity 152. As a result, the apparatus 110 can more uniformly planarize the microelectronic substrate 160 than can some conventional devices.

A further advantage of an embodiment of the apparatus 110 is that the microelectronic substrate 160 can precess relative to the planarizing pad 140 and the substrate support 150 without requiring a rotational coupling between the substrate support 150 and the lateral arm 138. Accordingly, the apparatus 110 can more uniformly planarize the microelectronic substrate 160 while retaining a relatively simple connection between the lateral arm 138 and the substrate support 150.

Yet a further advantage of an embodiment of the apparatus 110 is that the liquid bearing 143 eliminates the need for a removable film or pad between the bearing surface 151 and the microelectronic substrate 160. Accordingly, the need for supplying, maintaining, and/or replacing such pads can be eliminated.

Still another feature of an embodiment of the apparatus 110 shown in FIG. 2 is that the characteristics of the liquid bearing 143 can be monitored with one or more sensors 170. The sensors 170 can be coupled to the liquid supply conduit 154 and/or the actuator 136 in a feedback loop. An advantage of this arrangement is that the apparatus 110 can automatically adjust the pressure and/or quantity of liquid supplied to the liquid bearing 143 and/or the downward force applied by the actuator 136 in response to signals received from the sensor 170. In one aspect of this arrangement, the apparatus 110 can adjust the pressure and/or quantity of liquid supplied to the liquid bearing 143 in order to change the downward force applied to the microelectronic substrate 160. Either arrangement can accordingly reduce the likelihood that the microelectronic substrate 160 will directly contact the bearing surface 151. Another advantage of these arrangements is that the sensors 170 can detect "slip-out" of the microelectronic substrate 160 (i.e., an instance in which the microelectronic substrate 160 exits the cavity 152 during planarization). For example, the sensors 170 can directly detect the absence of the microelectronic substrate 160 from the cavity 152, and/or the sensors 170 can detect a change in the characteristics of the liquid bearing 143 that correspond to a slip-out condition. In an alternate arrangement, the thickness of the liquid bearing 143 can be controlled to prevent slip-out by keeping the liquid bearing 143 thick enough to prevent contact with the bearing surface 151 and thin enough that the cavity wall 155 does not rise completely above the side surface 163 of the microelectronic substrate 160.

Figure 3:
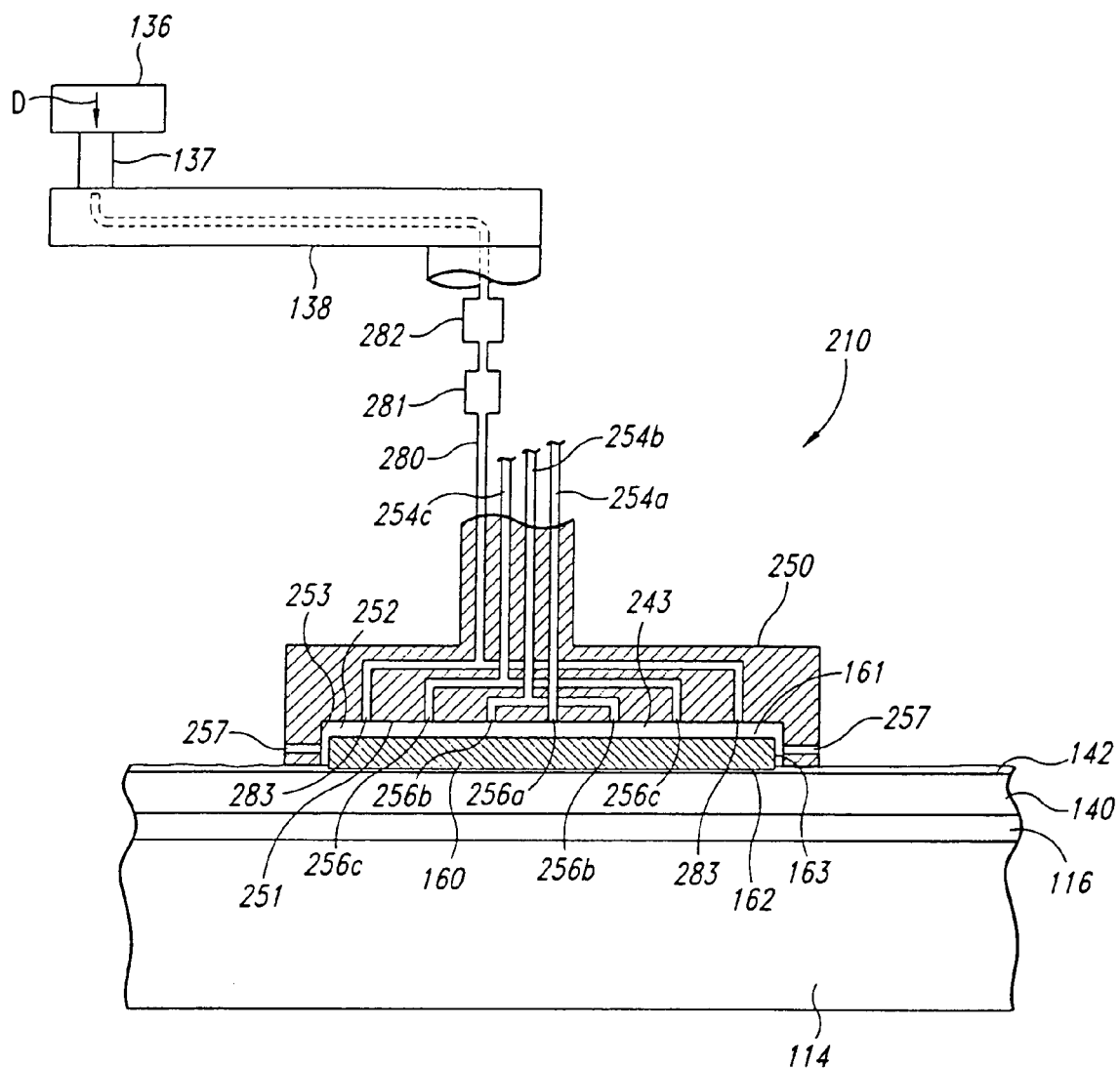
FIG. 3 is a partially schematic side elevational view of a portion of a planarizing apparatus that controls motion of a microelectronic substrate with a liquid bearing in accordance with another embodiment of the invention.

FIG. 3 is a partially schematic side elevational view of a portion of an apparatus 210 having a substrate support 250 in accordance with another embodiment of the invention. The substrate support 250 includes a cavity 252 defined by a cavity wall 253 and a bearing surface 251 that are sized to removably receive the microelectronic substrate 160. The cavity wall 253 can be relatively close to the side surface 163 of the microelectronic substrate 160 (as shown in FIG. 3) or the cavity wall 253 can be spaced apart from the side surface 163 to allow the microelectronic substrate 160 more room to precess in the manner described above with reference to FIG. 2.

In either of the above embodiments, the substrate support 250 can include a plurality of liquid supply conduits 254a-c and supply orifices 256a-c (collectively referred to as "liquid supply conduits 254" and "supply orifices 256," respectively). Each supply conduit 254a-c can be individually coupled to a source of bearing liquid at a different pressure. For example, the substrate support 250 can include a central liquid supply conduit 254a connected to a central orifice 256a, an intermediate liquid supply conduit 254b connected to intermediate orifices 256b, and an outer liquid supply conduit 254c coupled to outer orifices 256c. Accordingly, the substrate support 250 can apply different downward forces to different portions of the microelectronic substrate 160. This arrangement is advantageous because the spatially varying downward forces applied by the pressurized liquid can offset the naturally occurring center-to-edge planarization rate gradient that may result when the peripheral portions of the microelectronic substrate 160 move at higher velocity relative to the planarizing pad 140 than do the central portions of the microelectronic substrate 160.

In another aspect of the embodiment shown in FIG. 3, the substrate support 250 can include a plurality of relief channels 257 positioned radially outwardly from the liquid supply conduits 254 and the orifices 256. In one embodiment, the relief channels 257 extend through the cavity wall 253 from the region inside the cavity 252 to a region outside the cavity 252. Accordingly, the relief channels 257 can regulate the pressure within the cavity 252 by allowing a desired amount of liquid to exit the cavity and can accordingly regulate the thickness of a liquid bearing 243 that forms between the upper surface 161 of the microelectronic substrate 160 and the bearing surface 251 of the substrate support 250. When the liquid supplied to the liquid bearing 243 includes a planarizing liquid, the relief channels 257 can also provide a passage through which the planarizing liquid can flow to the planarizing pad 140.

In another aspect of the embodiment shown in FIG. 3, the substrate support 250 can include a vacuum conduit 280 in fluid communication with one or more vacuum orifices 283 positioned in the bearing surface 251 of the substrate support 250. The vacuum conduit 280 can be coupled to a vacuum source (not shown) to remove a portion of the fluid from the liquid bearing 243. In one aspect of this embodiment, the amount of liquid removed through the vacuum conduit 280 can be controlled (or stopped) to control the thickness of the liquid bearing 243. For example, the rate at which liquid is removed through the vacuum conduit 280 can be less than, greater than or equal to the rate at which liquid is supplied through the liquid supply conduit 254 to increase, decrease or leave unchanged, respectively, the thickness of the liquid bearing 243. The vacuum orifices 283 can be positioned radially outwardly from the supply orifices 256 so the bearing fluid flows toward the vacuum orifices 283 under centrifugal force as the substrate support 250 orbits. Alternatively, the relative positions of the supply orifices 256 and the vacuum orifices 283 can be different in other embodiments.

The vacuum conduit 280 can also remove particulate matter from the upper surface 161 of the microelectronic substrate 160. For example, at the beginning of the planarization operation, the liquid provided by the liquid supply conduits 254 can entrain residual foreign matter on the upper surface 161 of the microelectronic substrate 160. When the liquid is evacuated through the vacuum conduit 280, it carries the foreign matter with it and prevents the foreign matter from eventually reaching the lower surface 162 of the microelectronic substrate 160 and/or the planarizing surface 142 of the planarizing pad 140. Alternatively, if the liquid bearing 243 becomes so thin that the upper surface 161 of the microelectronic substrate 160 contacts the bearing surface 251 of the substrate support 250 and abrades particles from either the upper surface 161 or the bearing surface 251, the vacuum conduit 280 can remove the abraded particles before they reach the planarizing pad 140.

In still a further aspect of this embodiment, the apparatus 210 can include a particle sensor 281 in fluid communication with the vacuum conduit 280 to detect particles entrained in the fluid passing through the vacuum conduit 280. A change in the size, size distribution, number, concentration and/or other characteristics of the particulate matter detected by the particle sensor 281 can indicate the state of the liquid bearing 243. For example, if the number and/or median size of particles detected by the particle sensor 281 increases, the upper surface 161 of the substrate may have contacted the bearing surface 251 of the substrate support 250, indicating that the liquid bearing 243 is too thin. In a further aspect of this embodiment, the particle detector 281 can be operatively coupled to the liquid supply conduits 254 and/or the actuator 136 to control the thickness of the fluid bearing 243 in a manner generally similar to that discussed above with reference to FIG. 2. Alternatively, the apparatus 210 can include one or more of the sensors 170 discussed above with reference to FIG. 2 in addition to or in lieu of the particle detector 281.

In still another aspect of the embodiment shown in FIG. 3, the apparatus 210 can include a filter 282 in fluid communication with the vacuum conduit 280. The particle filter 282 can remove particulates from the fluid passing through the vacuum conduit 280. For example, the filter 282 can remove enough particles to allow the fluid to be recycled for re-use with either the same apparatus 210 or a different apparatus.

An advantage of an embodiment of the apparatus 210 discussed above with reference to FIG. 3 is that the vacuum conduit 280 can control the thickness of the fluid bearing 243. The vacuum conduit 280 can also remove particulates from the fluid forming the fluid bearing 243 before the particulates reach the interface between the lower surface 162 of the microelectronic substrate 160 and the planarizing surface 142 of the planarizing pad 140. Accordingly, the apparatus 210 can reduce the likelihood for forming scratches or other asperities on the lower surface 162 of the microelectronic substrate 160.

Figure 4:
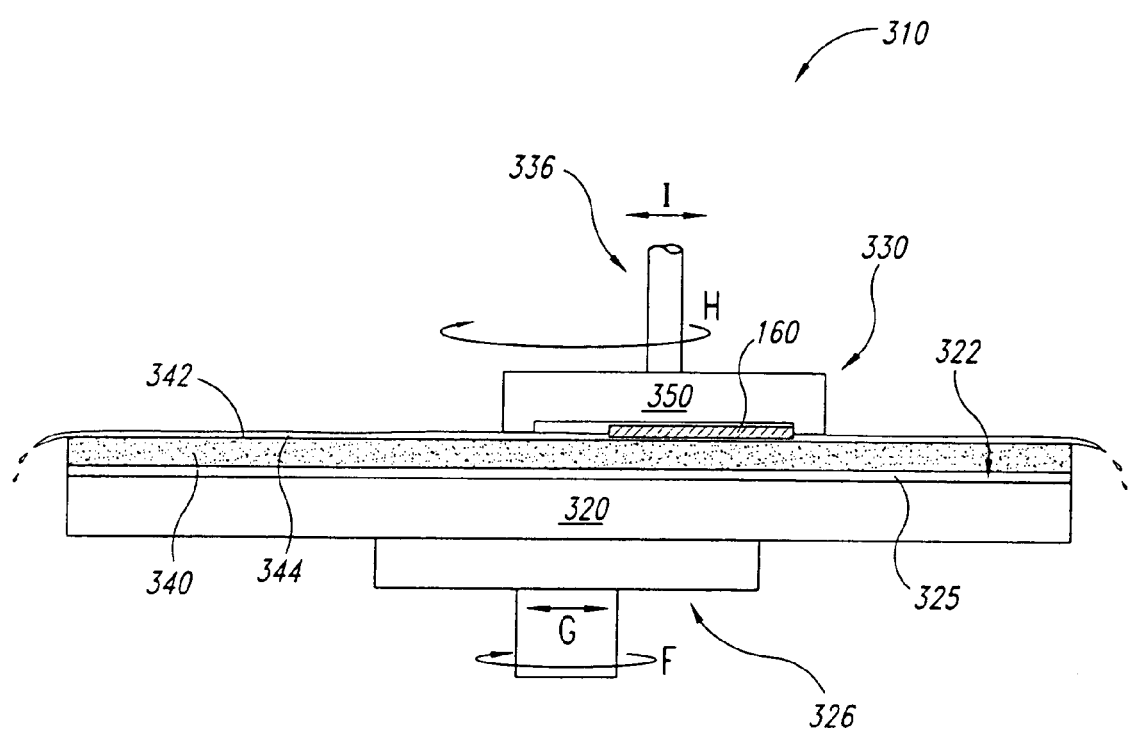
FIG. 4 is a partially schematic side elevational view of a rotary apparatus having a liquid bearing in accordance with yet another embodiment of the invention.

FIG. 4 is a partially schematic cross-sectional view of a rotary planarizing machine 310 with a generally circular platen or table 320, a carrier assembly 330, a planarizing pad 340 positioned on the platen 320 and a planarizing fluid 344 on the planarizing pad 340. The planarizing machine 310 may also have an under-pad 325 attached to an upper surface 322 of the platen 320 for supporting the planarizing pad 340. A drive 1S assembly 326 rotates (arrow "F") and/or reciprocates (arrow "G"), the platen 320 to move the planarizing pad 340 during planarization.

The carrier assembly 330 controls and protects the microelectronic substrate 160 during planarization. The carrier assembly 330 typically has a substrate holder 350 that supports the microelectronic substrate 160 and biases the microelectronic substrate 160 against the planarizing pad 340 in a manner generally similar to that discussed above with reference to FIGS. 2 and/or 3. A drive assembly 336 of the carrier assembly 330 typically orbits and/or translates the substrate holder 350 (arrows "H" and "I", respectively), also in a manner similar to that discussed above with reference to FIGS. 2 and/or 3. Alternatively, the drive assembly 336 can also rotate the substrate holder 350 about its central axis. The substrate holder 350 is the same as the substrate holders 150 and 250 described above with respect to FIGS. 2 and 3.

To planarize the microelectronic substrate 160 with the planarizing machine 310, the carrier assembly 330 presses the microelectronic substrate 160 against a planarizing surface 342 of the planarizing pad 340. The platen 320 and/or the substrate holder 350 then move relative to one another to translate the microelectronic substrate 160 across the planarizing surface 342. As a result, abrasive particles and/or chemicals in the planarizing pad 340 and/or the planarizing liquid 344 remove material from the surface of the microelectronic substrate 160.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for planarizing a microelectronic substrate, comprising:
   engaging a first surface of the microelectronic substrate with a planarizing pad;
   moving at least one of the microelectronic substrate or the planarizing pad relative to the other to remove material from the microelectronic substrate;
   disposing a liquid on a second surface of the microelectronic substrate facing generally opposite the first surface to form a liquid bearing;
   removing at least a portion of the liquid from the second surface of the microelectronic substrate via at least one of a channel or a conduit in a substrate support while disposing the liquid on the second surface of the substrate, wherein the at least one channel or conduit includes a first end, a second end opposite the first end, and an enclosed section extending between the first and second ends;
   detecting particle characteristics of the portion of liquid removed from the second surface of the microelectronic substrate; and
   controlling a thickness of the liquid bearing based on the detected particle characteristics.

2. The method of claim 1, further comprising:
   entraining matter in the portion of the liquid while the portion of the liquid is on the second surface of the microelectronic substrate; and
   removing at least some of the matter from the portion of the liquid after removing the portion of the liquid from the microelectronic substrate.

3. The method of claim 2, further comprising disposing the portion of the liquid on the same or a different planarizing pad after removing the matter from the portion of the liquid.

4. The method of claim 2 wherein removing matter from the liquid includes separating material removed from the microelectronic substrate from the liquid.

5. The method of claim 2 wherein entraining matter in the liquid includes entraining material removed from the microelectronic substrate.

6. The method of claim 2 wherein removing the matter from the liquid includes passing the liquid through a filter.

7. The method of claim 1, further comprising monitoring the portion of liquid removed from the microelectronic substrate for the presence of particulates.

8. The method of claim 1, further comprising monitoring the portion of the liquid removed from the microelectronic substrate for a change in the size and/or distribution of sizes of particulates in the fluid.

9. The method of claim 1, further comprising monitoring the portion of the liquid removed from the microelectronic substrate for a change in the concentration of particulates in the fluid.

10. The method of claim 1 wherein removing a portion of the liquid from the second surface of the microelectronic substrate includes applying a vacuum to the liquid.

11. The method of claim 1, further comprising supplying the liquid to the second surface of the microelectronic substrate at a first rate and removing the portion of the liquid from the second surface of the microelectronic substrate at a second rate approximately equal to the first rate.

12. The method of claim 1 wherein removing the liquid comprises exhausting the at least a portion of the liquid from the second surface of the microelectronic substrate to control a thickness of the liquid between the second surface of the substrate and the substrate support.

13. A method for planarizing a microelectronic substrate, comprising:
    positioning the microelectronic substrate proximate to a substrate support with a first surface of the microelectronic substrate facing toward a planarizing surface of a planarizing pad;
    urging the microelectronic substrate toward the planarizing surface by directing a flow of liquid toward a second surface of the microelectronic substrate facing generally opposite the first surface to form a liquid bearing;
    moving at least one of the microelectronic substrate or the planarizing pad relative to the other to remove material from the microelectronic substrate;
    removing at least a portion of the liquid at the second surface of the microelectronic substrate via a vacuum conduit in the substrate support;
    detecting particle characteristics of the portion of liquid removed from the second surface of the microelectronic substrate; and
    controlling a thickness of the liquid bearing based on the detected particle characteristics.

14. The method of claim 13 wherein removing the liquid comprises exhausting the at least a portion of the liquid at the second surface of the microelectronic substrate to control a thickness of the liquid between the second surface of the microelectronic substrate and the substrate support.

15. The method of claim 13 wherein:
    removing the liquid comprises exhausting the at least a portion of the liquid at the second surface of the microelectronic substrate via a plurality of vacuum orifices in the substrate support, the vacuum orifices being in fluid communication with the vacuum conduit; and
    urging the microelectronic substrate comprises flowing the liquid through a supply conduit and a plurality of supply orifices in the substrate support, the supply orifices being in fluid communication with the supply conduit.

16. The method of claim 15 wherein the vacuum orifices are arranged radially outward of the supply orifices in the substrate support.

17. The method of claim 13, further comprising:
    entraining matter in the portion of the liquid while the portion of the liquid is at the second surface of the microelectronic substrate; and
    removing at least some of the matter from the portion of the liquid after removing the portion of the liquid from the microelectronic substrate.

18. The method of claim 13, further comprising monitoring the portion of the liquid removed from the microelectronic substrate for the presence of particulates.

19. The method of claim 13, further comprising monitoring the portion of the liquid removed from the microelectronic substrate for a change in the size and/or distribution of sizes of particulates in the fluid.

20. The method of claim 13 wherein:
    urging the microelectronic substrate comprises directing the flow of liquid toward the second surface of the microelectronic substrate at a first rate; and
    removing the liquid comprises exhausting the at least a portion of the liquid from the second surface of the microelectronic substrate at a second rate at least approximately equal to the first rate.

21. The method of claim 1 wherein removing at least a portion of the liquid includes flowing liquid from the second surface of the substrate to the planarizing pad through at least one relief channel in the substrate support.

* * * * *